United States Patent
Keskikangas et al.

(10) Patent No.: US 12,401,801 B2
(45) Date of Patent: Aug. 26, 2025

(54) SYSTEM AND METHOD FOR IMAGE CODING USING DUAL IMAGE MODELS

(71) Applicant: Axis AB, Lund (SE)

(72) Inventors: Axel Keskikangas, Lund (SE); Viktor Edpalm, Lund (SE)

(73) Assignee: AXIS AB, Lund (SE)

( * ) Notice: Subject to any disclaimer, the term of this patent is extended or adjusted under 35 U.S.C. 154(b) by 61 days.

(21) Appl. No.: 18/295,556

(22) Filed: Apr. 4, 2023

(65) Prior Publication Data

US 2023/0328260 A1 Oct. 12, 2023

(30) Foreign Application Priority Data

Apr. 11, 2022 (EP) ..................................... 22167664

(51) Int. Cl.
*H04N 19/167* (2014.01)
*G06T 7/70* (2017.01)
(Continued)

(52) U.S. Cl.
CPC ............. *H04N 19/167* (2014.11); *G06T 7/70* (2017.01); *G06V 10/25* (2022.01); *H04N 19/159* (2014.11);
(Continued)

(58) Field of Classification Search
CPC ................ G06V 10/25; G06V 2201/07; G06T 2207/20084; G06T 7/70; G06T 9/002;
(Continued)

(56) References Cited

U.S. PATENT DOCUMENTS

2006/0251330 A1  11/2006  Toth et al.
2010/0296583 A1* 11/2010  Li ......................... H04N 19/162
                                                        382/173
(Continued)

FOREIGN PATENT DOCUMENTS

CN   108833925 A   11/2018
CN   110493596 A   11/2019
(Continued)

OTHER PUBLICATIONS

Extended European Search Report dated Oct. 5, 2022 for European Patent Application No. 22167664.6.
(Continued)

*Primary Examiner* — William C Vaughn, Jr.
*Assistant Examiner* — Astewaye Gettu Zewede
(74) *Attorney, Agent, or Firm* — Volpe Koenig

(57) ABSTRACT

A method of encoding an image comprises establishing whether objects constituting one or more predefined object types or performing one or more predefined event types are visible in the image; in response to establishing that the objects are visible, encoding at least one region-of-interest of the image using a non-generative image model, thereby obtaining first image data; and encoding any remainder of the image using a generative image model, thereby obtaining second image data, wherein use of the non-generative image model enables decoding of the first image data without relying on information derived from images other than the encoded image or, if the image is a frame in a video sequence, enables decoding of the first image data without relying on information derived from images outside the video sequence.

15 Claims, 4 Drawing Sheets

(51) Int. Cl.
*G06V 10/25* (2022.01)
*H04N 19/159* (2014.01)

(52) U.S. Cl.
CPC .......... *G06T 2207/20084* (2013.01); *G06V 2201/07* (2022.01)

(58) Field of Classification Search
CPC ...... G06N 3/0475; H04N 19/20; H04N 19/60; H04N 19/70; H04N 19/159; H04N 19/162; H04N 19/167; H04N 19/17; H04N 19/172; H04N 19/467; H04N 19/503; H04N 21/234345
USPC .......................................... 375/240
See application file for complete search history.

(56) References Cited

U.S. PATENT DOCUMENTS

| | | |
|---|---|---|
| 2015/0016510 A1 | 1/2015 | Carlsson et al. |
| 2016/0173882 A1 | 6/2016 | Mishra et al. |
| 2016/0269712 A1* | 9/2016 | Ostrover ................ H04S 7/301 |
| 2016/0337647 A1 | 11/2016 | Cheok et al. |
| 2018/0139456 A1 | 5/2018 | Cheok et al. |
| 2019/0007690 A1 | 1/2019 | Varadarajan et al. |
| 2019/0163982 A1* | 5/2019 | Block .................... G06N 5/022 |
| 2020/0186809 A1 | 6/2020 | Mukherjee et al. |
| 2021/0049468 A1 | 2/2021 | Karras et al. |
| 2021/0152834 A1* | 5/2021 | Guruva reddiar ... H04N 19/172 |
| 2022/0141490 A1* | 5/2022 | Kim ..................... H04N 19/597 348/36 |
| 2022/0188346 A1* | 6/2022 | Melnik .................. G06V 10/82 |

FOREIGN PATENT DOCUMENTS

| | | | |
|---|---|---|---|
| CN | 111447449 A | 7/2020 | |
| CN | 111541900 A | 8/2020 | |
| WO | WO-2021205065 A1 * | 10/2021 | ........... G06K 9/4628 |

OTHER PUBLICATIONS

Liu et al., "Deep Learning-Based Video Coding: A Review and a Case Study." ACM Computing Surveys (CSUR). 53. 1-35 (2020).
Zhao et al., "Deep Video Coding with Dual-Path Generative Adversarial Network." (2021).
Sun et al. "Content-aware rate control scheme for HEVC based on static and dynamic saliency detection." Neurocomputing 411, 393-405, (2020).

* cited by examiner

SYSTEM AND METHOD FOR IMAGE CODING USING DUAL IMAGE MODELS

FIELD OF INVENTION

The present disclosure relates to the field of image coding, including video coding. It proposes an encoding method by which different image regions are coded using different image models in dependence of objects or events recognized in the image.

TECHNICAL BACKGROUND

Artificial intelligence (AI) based image codecs, where trained neural networks carry out the vital encoding and decoding steps, are making strides in many areas of application, where they promise high-quality video at staggeringly low bitrates. With this technology, in broad terms, a plaintext representation of the original image is given to an encoder network that outputs a feature vector, a binary file that can be imagined as a list of the most important visual features of the image. To restore the image on the recipient side, the feature vector is fed to a decoder network trained to generate a restored image, which shall be as similar as practicable to the original image. A common practice is to train the encoder and decoder networks in tandem, and on the basis of training data representative of the imagery expected to be encountered in the intended use case. It has been proven repeatedly that AI-based image codecs can achieve excellent similarity with the original image if the two neural networks have been trained methodically and on suitable data.

The point is occasionally made that AI-encoded images are of lower evidentiary value, namely, since the feature vector cannot be traced back to the pixels of the original image as transparently as in conventional image coding. Even in the face of massive proof that a specific AI-based codec has successfully restored images without defects visible to a human viewer, skeptics argue that the high quality of the restored image is deceptive as it could be contaminated with elements of training data, or with randomized information sampled from a probability distribution. Concerns of this nature are rarely voiced against lossy conventional image codecs, which are perceived as more reliable. Here, while the deliberate discarding of information on the encoding side—which is necessary to compress the image—will produce a commensurate visual degradation of the reconstructed image or introduce artefacts, these imperfections can be recognized precisely as imperfections, and are thereby less likely to mislead the viewer. If the skepticism to AI-based image codecs was to be broadly embraced in the community, it would likely limit the usefulness of these codecs in the collecting of images for law-enforcement purposes, like in surveillance and monitoring video systems.

It would be desirable to reap the benefits of AI-based image codecs, notably their high compression ratio, while securing image data of an undisputable evidentiary value.

SUMMARY

The present disclosure makes available an image encoding method which discriminates between different image regions and encodes them using different image models, from which one image model enables a verifiable chain of encoding and decoding. In particular, this one image model may enable decoding without relying on information derived from images other than the encoded image (or, where the image is a frame in a video sequence, without relying on information from outside the video sequence). Alternatively, said one image model should enable decoding without inserting information derived from images other than the encoded image (or outside its own video sequence). Alternatively, said one image model should enable decoding without processing the coded image data by a function that depends on information derived from images other than the encoded image (or outside its own video sequence). Alternatively, said one model may enable non-stochastic decoding. Additionally, using said one image model for the coding of image regions where objects with an increased forensic relevance may be visible may be beneficial. It would also be good to make available an image decoding method for use together with the sought-for image encoding method, as well as suitable hardware.

A least some of these objects are achieved by the device and method defined by the independent claims. The dependent claims relate to advantageous embodiments.

In a first aspect, there is provided a method of encoding an image. The method comprises the steps: establishing whether objects constituting one or more predefined object type or performing one or more predefined event types are visible in the image; if it is established that such objects are visible, at least one region-of-interest (ROI) of the image is encoded using a non-generative image model, and first image data representing the ROI is obtained. Any remainder of the image (i.e., complement of ROI) is then encoded using a generative image model, and second image data representing the remainder is obtained. The use of the non-generative image model enables decoding of the first image data without relying on information derived from images other than the encoded image. Alternatively, if the image is a frame in a video sequence, the use of the non-generative image model enables decoding of the first image data without relying on information derived from images outside the video sequence.

In the present disclosure, an "image model" includes a functional definition (e.g., functional specification, pseudo-code, equations) of an encoder and a functional definition of a decoder, which are arranged to convert images to and from a common image data format. The image data may be digital; it may relate to pixel values, transform coefficients, feature vectors or similar information types. An image model that includes at least one generative component (e.g., a generative decoder) will be referred to as a generative image model, and is otherwise categorized as non-generative. An encoder can use a particular image model without being configured with the complete image model; for example, an implementer may choose to equip only the encoding device with an encoder in conformity with the particular image model, as the decoder is not needed anyhow.

Examples of generative image models are those that include one or more of the following: a machine-learning based (or AI-based) encoder, an artificial neural network encoder, an autoencoder, a variable autoencoder, a generative adversarial network (GAN) encoder, a convolutional neural network (CNN) encoder, a recurrent neural network (RNN) encoder, an autoregressive model, a flow model. Examples of non-generative image models are those which include encoding in accordance with one or more of: transform coding, a combination of predictive coding (e.g., interframe time-predictive coding) and transform coding (so-called hybrid coding), ITU H.26x, in particular H.264, H.265 and H.266, AOMedia Video 1 (AV1), versions of JPEG, such as JPEG2000. At least H.26x and AV1 can be described as image models with hybrid coding.

Provision is made for the widespread use of neural networks as function approximators (or predictors, or regressors), even in implementations of codecs according to non-generative image models. For example, the use of such function approximators is disclosed in CN110493596 and US20060251330, to implement conventional entropy coding and intra-frame prediction coding. In such implementations, however, the function approximators carry out computational tasks which could equivalently be entrusted to conventional processing circuitry, albeit at a higher computational cost, and/or which constitute isolated steps in a non-generative encoding or decoding algorithm. Function approximators are generally not configured for input or output in the form of a feature vector or other latent-space representations. Further still, neural networks to be used as function approximators are generally not trained on information derived from images but are trained on function values. For purposes of the present disclosure, therefore, the fact that a non-generative image model is or can be implemented by means of one or more neural networks acting as function approximators does not alter the categorization of the image model as non-generative.

It is appreciated, furthermore, that an "object" constituting a predefined object type or performing a predefined event type can refer to a material object, a person, an animal, a non-material object (e.g., optical phenomena) or an object which realizes a predefined event (e.g., a predefined movement pattern which is independent of the type of moving object).

Because the method according to the first aspect uses a non-generative image model to encode the ROI, where the object was detected, the resulting first image data will be decodable without any risk of contamination with extraneous image data. Extraneous image data refers to images other than the encoded image or, if the image is a frame in a video sequence, to images outside the video sequence. The unwanted contamination may be an indirect effect of training. For example, if a decoder network has absorbed graphic information from the training data and users believe that it allows this information to migrate without moderation into the restored images, then the decoder network could be perceived as unfit to supply evidence for law-enforcement purposes. By contrast, the encoding method according to the first aspect handles the ROI in the context of a verifiable chain of encoding and decoding. Because the remainder of the image is encoded using the generative image model—the remainder is the entire image if no object is visible—the image can be encoded with a favorable overall compression ratio, which economizes storage and transmission capacity.

In some embodiments, the use of the non-generative image model enables decoding of the first image data without inserting information derived from extraneous image data. When a generative image model is used, by contrast, the decoding process could use a codebook built from historic graphic data, wherein conceptually the coded image data takes the role of an instruction to combine elements of the codebook into a restored image.

In some embodiments, the use of the non-generative image model enables decoding of the first image data without processing the first image data by a function that depends on information derived from images other than the encoded image. When a generative image model is used, by contrast, the decoding process may utilize a decoding neural network (which can abstractly be understood to constitute a function) that has been trained using historic image data, e.g., raw images or images that have been pre-processed for the purpose of training the neural network. In addition to this type of dependence, which may be qualified as an offline dependence, other generative image models may utilize a decoding network that undergoes continued updates or refinements based on newer image data (retraining), even after the commercial operation of the decoding network has begun.

In some embodiments, the non-generative image model enables non-stochastic decoding. By contrast hereto, the decoder in some available generative image models produces the reconstructed image by stochastic sampling from a probability distribution. For example, the Glow™ model (https://openai.com/blog/glow/) can be used to define an image model with such characteristics. Even the probability distribution itself may have been defined based on information other than the image to be encoded, and the indirect influence of such information could be considered to introduce a further level of uncertainty in the decoding process. In these embodiments, because an image model which is non-generative by virtue of its non-stochastic decoder is used, the risk of having the restored image contaminated with randomness and/or training data is reduced or eliminated.

In some embodiments, wherein the generative image model includes an artificial neural network with trainable weights, a snapshot of the trainable weights is stored when it is established that objects constituting one or more the predefined object types or performing one or more of the predefined event types are visible in the image. With access to the snapshots of the neural network weights, it is possible to repeat the encoding operation as often as desired for verification purposes. These embodiments, where the ROI is encoded using the non-generative image model and where the remainder is encoded by a repeatable encoding process, thus enable a complete verification of the encoded image. If the image is part of a larger material (e.g., it is a frame in a video sequence), the storing of the snapshot is not mandatory for every new image where said objects are visible; rather, the storing may be dispensed with if one snapshot has already been stored and it is certain that the neural network weights have not been updated since. These conditions may be fulfilled where the encoding is performed by a commercial software product, for which the vendor distributes upgrades on a periodic or event-triggered basis. In further developments of the method, additional data integrity is ensured by adding a further step of generating a digital signature for a dataset that includes the snapshot of the trainable weights, the first image data and the second image data.

In some embodiments, the ROI is a proper subset of the image, and the remainder is nonempty. In other embodiments, the ROI is the full image, and the remainder is empty; in other words, it is decided to encode the entire image using the non-generative image model as soon as an object constituting one or more of the predefined object types or performing one or more of the predefined event types is visible somewhere in the image, and otherwise the generative image model is used throughout.

There are different ways, in different embodiments, to establish whether at least one object constituting one or more of the predefined object types or performing one or more of the predefined event types is visible. A visual object-recognition or event-recognition process can be executed for this purpose, and especially an automated or computer-implemented process can be used. The recognition process is visual in the sense of being based on the image to be encoded. Alternatively or additionally, the presence of an object constituting one or more of the predefined object types or performing one or more of the predefined event types can be established based on data from a detector configured to monitor a scene of the image, where the scene may correspond to a field of view of a camera recording the image, or a neighborhood of the scene. The detector can be configured to capture acoustic, vibratory, chemical, mechanic or electromagnetic excitations, including capturing an alternative representation of the scene (e.g., in infrared light) which facilitates the detection of the relevant objects. Operator input constitutes a further way of establishing whether relevant objects are visible in the image; the input may be a Boolean signal signifying that the operator has noted that an object is visible or an indicated image region where the operator sees an object.

Within the embodiments just discussed, it is envisioned that when the object visibility establishment step yields a location of the recognized object (e.g., when an object-detection or event-detection process is used), the ROI is defined on the basis of this location. It is understood that the location of the object is expressed in image coordinates or can be converted into image coordinates. The ROI can be defined with a nonzero margin 5, signifying that the ROI shall extend at least 5 units outside the recognized object. The margin 5 can be applied isotropically or only in some directions, e.g., in a momentary movement direction. The limits of the recognized object may be a bounding box or an approximate contour (mask). The size of the margin 5 may be determined by considering a maximum motion vector size to be used by the encoder, or the accuracy of the location and/or bounding box of the recognized object. If the ROI, which is to be encoded using the non-generative image model, is extended by a nonzero margin 5, the probability increases that the content of the ROI can be encoded predictively (see also below) to a greater extent. This helps control the coding bitrate. In particular, it may become possible to rely on motion video coding techniques. Conversely, in embodiments where the ROI covers just the recognized object, chances are that visual objects might be moving into or out of the ROI while the non-generative image model is going to be used, so that the I-block/P-block ratio (or I-frame/P-frame ratio) could be somewhat higher.

In some embodiments, the object or event recognition process can be restricted to a predefined image area, whereby objects outside this area have no influence on the choice between the generative and the non-generative image model. In some embodiments, the object or event recognition process is configured to recognize objects with an increased forensic relevance.

In some embodiments, the first image data and/or second image data indicates a location of the ROI. This indication can be relied upon at the decoding side, and more precisely in a step of combining those image regions that are restored using the generative image model and those that are restored using the non-generative image model. The location can be indicated implicitly or explicitly.

In some embodiments, it is not only the remainder (i.e., complement of the ROI) that is encoded using the generative image model, but also a portion of the ROI is encoded using the generative image model. The data resulting from the encoding of this portion may be referred to as third image data. The portion may be a boundary zone of the ROI, by which the continuity between the ROI and the remainder can be verified. In particular, an encoding of the entire image using the generative image model can continue in parallel to the encoding of the ROI using the non-generative image model. In this manner, two coded copies of the ROI are available, which may be used as confirmation of the reliability of the generative coding model. Furthermore, and especially in the coding of a video sequence, the encoding which uses the generative image model may function better or more economically if it is consistently fed with an image area of constant size and position. For example, there may be more frequent and more immediate opportunities to express image features of consecutive video frames predictively, as increments or block movements.

In some embodiments, the image is a frame in a video sequence, and the encoding of the ROI or the encoding of the remainder, or both, apply an inter-frame prediction method. Inter-frame prediction may include predicting and/or interpolating the appearance of frames based on an assumed temporal correlation between consecutive frames, e.g., because the frames depict the same scene. This is the case, for example in ITU H.264 coding (a non-generative model) and may be applied analogously, as a pre- or post-processing processing step, in coding according to generative image models. In these embodiments, additionally, it may be established whether the objects are visible by applying prediction and/or interpolation regarding the presence of the objects and/or their location based on an assumed temporal correlation of between consecutive frames. For example, an object or event recognition process may be executed for every nth frame (where n≥2 is an integer) to obtain object locations, which are then processed by an interpolation operation to provide object locations in the intervening subsequences of n−1 frames each. In this context, it may be relevant to apply interpolation if a particular recognized object reappears n frames later. In these embodiments, there is a further option to use visual motion tracking and/or a camera orientation parameter and/or a camera field-of-view parameter (of a camera which records or has recorded the video sequence) to follow a particular recognized object through subsequent frames of the same video sequence.

In some embodiments of the first aspect, where the image is associated with audio, also the audio is selectively encoded using a non-generative audio model. For instance, if a video sequence is considered, any frame for which it is established that said objects are visible therein, the audio associated with the frame (e.g., an audio segment recorded contemporaneously with the frame) is encoded using a non-generative audio model; and in such other frames where it is not established that said objects are visible, the associated audio is encoded using an arbitrary audio model. The use of the non-generative audio model enables decoding of the audio without relying on information derived from audio data other than said associated audio. The arbitrary audio model may be a generative audio model, which could provide advantageous data compression.

In one embodiment, there is provided a method of encoding an image which is a frame in a video sequence. The method comprises the steps: establishing whether objects constituting one or more predefined object types or performing one or more predefined event types are visible in the image; if it is established that such objects are visible, at least one region-of-interest (ROI) of the image is encoded using a non-generative image model, and first image data representing the ROI is obtained. Any remainder of the image (i.e., complement of ROI) is then encoded using a generative image model, and second image data representing the remainder is obtained. The use of the non-generative image model enables decoding of the first image data without relying on information derived from images which are not frames in the video sequence.

In a second aspect, there is provided a method of decoding image data representing an image, wherein the image data includes first image data obtained by encoding using a non-generative image model and second image data obtained by encoding using a generative image model, the method comprising: decoding the first image data using the non-generative image model without relying on information derived from images other than the encoded image or, if the image is a frame in a video sequence, without relying on information derived from images outside the video sequence, thereby obtaining a first region of the image; decoding the second image data using the generative image model, thereby obtaining a second region of the image; and combining the first and second regions of the image.

Here, because the first image data has been obtained by encoding using a non-generative image model, it is decoded without any risk of contamination with extraneous image data. This confirms the evidentiary value of the restored first image region. The decoding method is part of a verifiable chain of encoding and decoding. Because the second image data has been obtained by encoding using a generative image model, the total size of the first and second image data can be advantageously limited.

In some embodiments of the second aspect, as mentioned above, the combining can be assisted by an indication of the location of the first region of the image (e.g., relative to the second region), which indication can be derived from the first or second image data.

In further aspects, there are provided an encoding device and a decoding device, which are respectively configured to perform the methods of the first and second aspects. The encoding device comprises processing circuitry which is selectively operable in accordance with a non-generative image model and a generative image model, wherein use of the non-generative image model enables image data representing an encoded image to be decoded without relying on information derived from images other than the encoded image or, if the encoded image is a frame in a video sequence, enables the image data to be decoded without relying on information derived from images outside the video sequence. The decoding device too is equipped with processing circuitry with this dual functionality. The processing circuitry may be a single processor (or a single processor network) alternatingly executing software code corresponding to the generative and the non-generative image models, or the processing circuitry can be split into multiple hardware portions that have these respective functionalities.

The present disclosure is further relates to a computer program containing instructions for causing a computer, or the encoding device or decoding device in particular, to carry out the above methods. The computer program may be stored or distributed on a data carrier. As used herein, a "data carrier" may be a transitory data carrier, such as modulated electromagnetic or optical waves, or a non-transitory data carrier. Non-transitory data carriers include volatile and non-volatile memories, such as permanent and non-permanent storage media of magnetic, optical or solid-state type. Still within the scope of "data carrier", such memories may be fixedly mounted or portable.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order described, unless explicitly stated.

BRIEF DESCRIPTION OF THE DRAWINGS

Aspects and embodiments are now described, by way of example, with reference to the accompanying drawings, on which.

DETAILED DESCRIPTION

The aspects of the present disclosure will now be described more fully hereinafter with reference to the accompanying drawings, on which certain embodiments are shown. These aspects may, however, be embodied in many different forms and should not be construed as limiting; rather, these embodiments are provided by way of example so that this disclosure will be thorough and complete, and to fully convey the scope of all aspects to those skilled in the art. Like numbers refer to like elements throughout the description.

Figure 1:
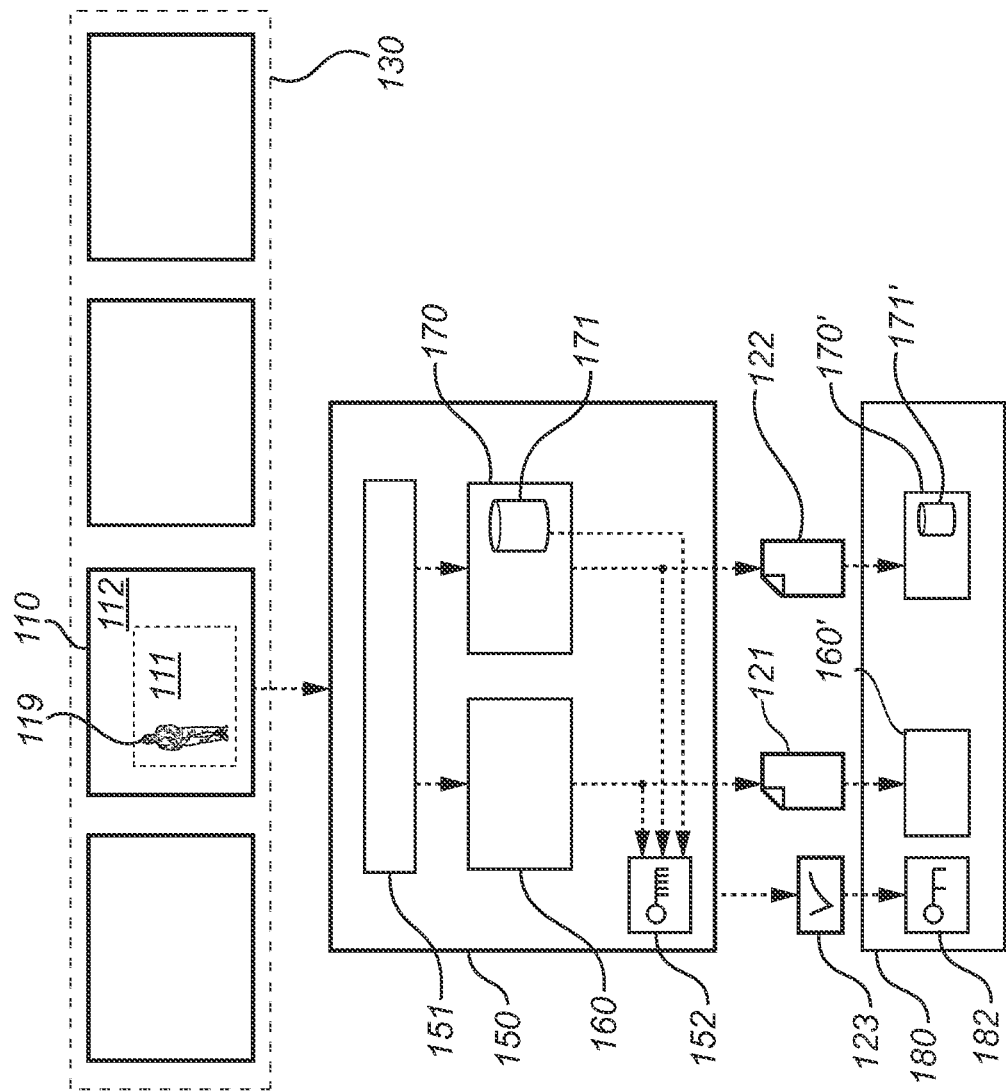
FIG. 1 shows an encoding device and a decoding device in accordance with embodiments herein.

The upper portion of FIG. 1 illustrates a video sequence 130 which comprises a plurality of images 110 constituting video frames. In a current one of the video frames, an object 119 is visible inside a ROI 111. According to some embodiments of the present invention, the ROI 111 is to be encoded using a non-generative image model, whereas the remainder 112 of the video frame is to be encoded using a generative image model.

Immediately below the video sequence 130 in FIG. 1, there is shown an encoding device 150 which receives the image 110 in a plaintext representation, such as a set of pixel intensity values in plaintext or expressed by lossless coding (e.g., Huffman coding). In the encoding device 150, a discriminator 151 separates the image 110 into the ROI 111 and the remainder 112 and feeds these, respectively, to an encoder 160 that is configured to use a non-generative image model and an encoder 170 configured to use a generative image model. The encoder 170 for the generative image model may utilize a neural network (encoder network) 171 with weights which have been trained in accordance with images other than the image 110 to be encoded. (In particular, the encoder 170 may utilize a neural network 171 with weights that have been trained in accordance with images outside the video sequence 130.) The discriminator 151 may include an automated or operator-assisted object recognition or event recognition process, and/or an interface for receiving and analyzing sensor signals (e.g., signals from detectors monitoring a scene of the image 110 or a neighborhood of the scene) that supplement the visual data in the image 110, with the common aim of establishing that an object is present and where it is located. The encoder 160 for the non-generative image model outputs first image data 121, and the encoder 170 for the generative image model outputs second image data 122 (and, in some embodiments, third image data encoding an overlap between the ROI 111 and remainder 112). An optional signing function 152, in which a private key of a cryptographic key pair has been deposited, may generate a digital signature 123 by which a recipient can verify the authenticity of the first and second image data 121, 122. More precisely, according to a per se known approach, the signing function 152 may compute a hash of the first and second image data 121, 122 and generate the digital signature 123 based on the hash.

The lower portion of FIG. 1 shows a decoding device 180. Since one of the aims of image coding is to enable transfer and storage of images, the encoding and decoding devices 150, 180 need not be co-located or controlled by the same entity. Similarly, image data may be retrieved from a memory and used for restoring the original image much later. In the decoding device 180, a decoder 160' using the above-mentioned non-generative image model and a decoder 170' using the above-mentioned generative image model are implemented. The decoder 170' may include a neural network (decoder network) 171' with weights obtained by training on extraneous image data, and preferably in conjunction with the encoder network 171. Further still, the decoder 170' can be configured to perform stochastic sampling from a probability distribution. The two decoders 160', 170' are responsible for restoring the ROI and the remainder of the image 110, respectively, which are then combined and output. The decoding device 180 includes an optional signature verification function 182, in which a public key of the above-mentioned cryptographic key pair has been deposited, which is configured to use the digital signature 123 to assess whether the first and second image data 121, 122 are authentic.

It is appreciated that FIG. 1 is a purely functional illustration of the inner workings of the encoding and decoding devices 150, 180, which does not necessarily reflect the structure of the processing hardware on which it is implemented. Indeed, one functional block (box) may correspond to a section of computer-executable code running on a processor or a processor network, a dedicated component (e.g., ASIC, FPGA) or a combination of these. Cloud implementations, where the functionalities of the encoding and decoding devices 150, 180 are fulfilled by networked processing resources, are envisioned as well and fully contained in the scope of the present disclosure.

For a general description of the training of an encoder network and a decoder network (synthesis network), reference is made to the disclosure of US20210049468, in which such networks are trained according to a GAN objective function, so as to produce feature vectors (appearance vectors) for images and reconstruct the images. Paragraphs 0199, 0201, 0202 and 0206, as well as the corresponding FIGS. 7A and 7B, are of primary relevance.

Figure 2:
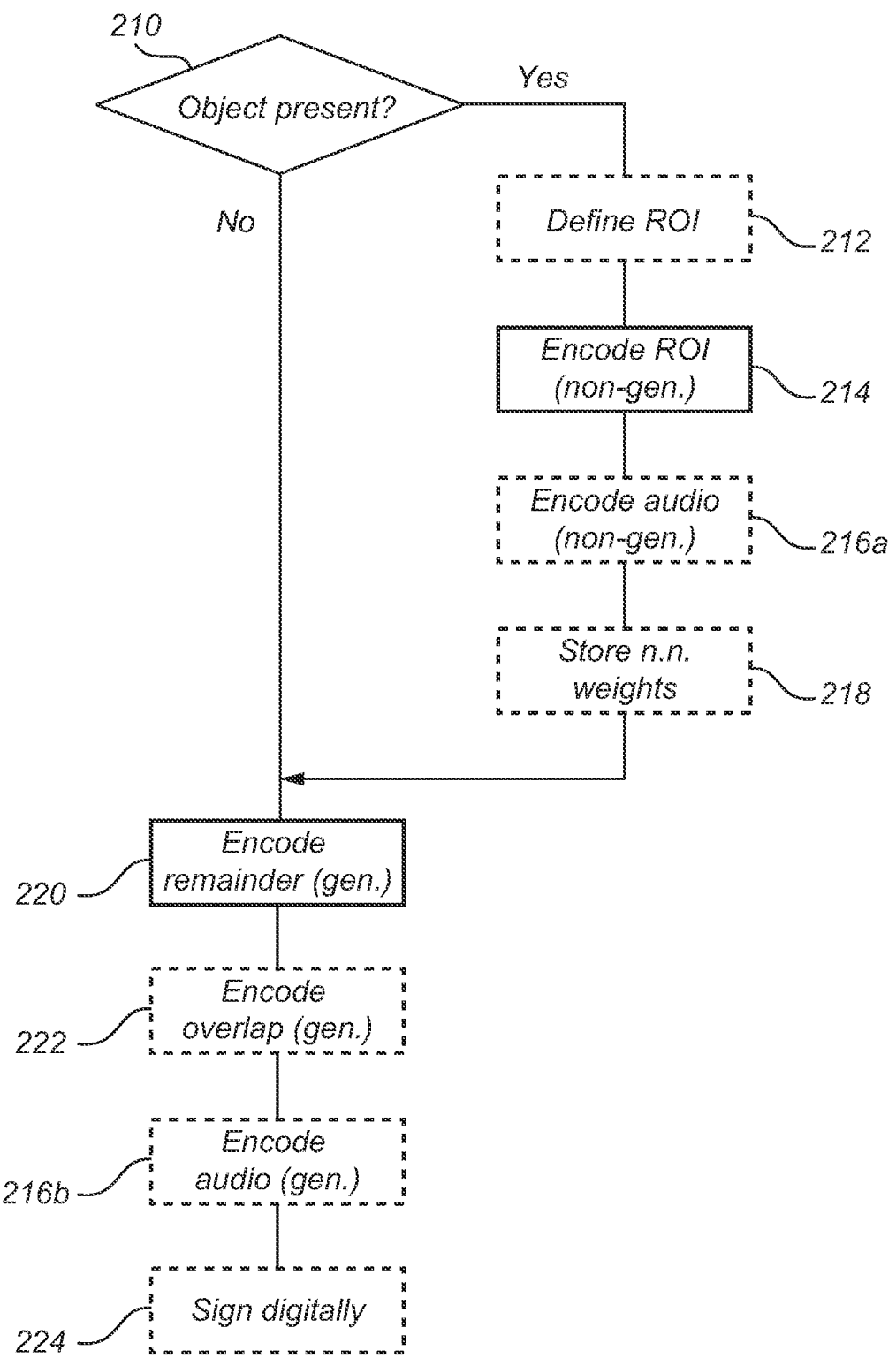
FIG. 2 is a flowchart of an encoding method in accordance with embodiments herein.

With reference to the encoding method 200 in FIG. 2, there will now be presented a more detailed description of the functioning of the encoding device 150 according to some embodiments. Because the encoding method 200 is not per se linked to the illustrated structure of the encoding device 150, however, it can as well be implemented on a generic programmable computer.

In a first step 210 of the method 200, it is established whether objects constituting an object type of one or more predefined object types or performing an event type of one or more predefined event types are visible in the image. As mentioned above, the term "object" shall extend also to objects (of arbitrary types) which realize a predefined event type. Step 210 may include executing a visual object recognition process, executing a visual event recognition process, obtaining data from a detector configured to monitor a scene of the image, or obtaining operator input. Alternatively or additionally, step 210 may include receiving and analyzing sensor signals that supplement the visual data in the image 110, such as a signal from a camera or a motion detector directed onto the scene of the image 110 or onto a neighborhood thereof, or another detector signal from which an increased likelihood that an object is about to appear in the image 110 can be inferred. For example, a sensor signal from a detector indicating the opening of a door or gate leading into a space visible in the image 110 may suggest that a person or object is about to enter this space and will become visible in the image 110. Such sensor signals may be used as a basis for establishing 210 that an object agreeing with the predefined object types or event types is visible in the image 110.

In embodiments where a visual recognition process is utilized, an operator may have configured this process with the desired object types and/or event types in advance. In other words, even though the operator may be authorized to reconfigure or adjust such settings at runtime, the object types and event types are "predefined" from the point of view of the entity which executes the method 200. The operator may have configured the object types and/or event types so that objects with an increased forensic relevance are to be recognized. Accordingly, the object types could include vehicles and persons, and more specifically burglary tools, locksmith tools, spray-paint cans, knives, firearms, explosives, concealing garments, uniforms, tattooed body parts, emergency vehicles, merchandise, packaging and cameras; and the event types could include patterns such as cutting or sawing movements, spraying movements, flames, explosions, trespassing, climbing, unusually long dwelling, physical abuse and certain vehicle maneuvers.

Figure 4:
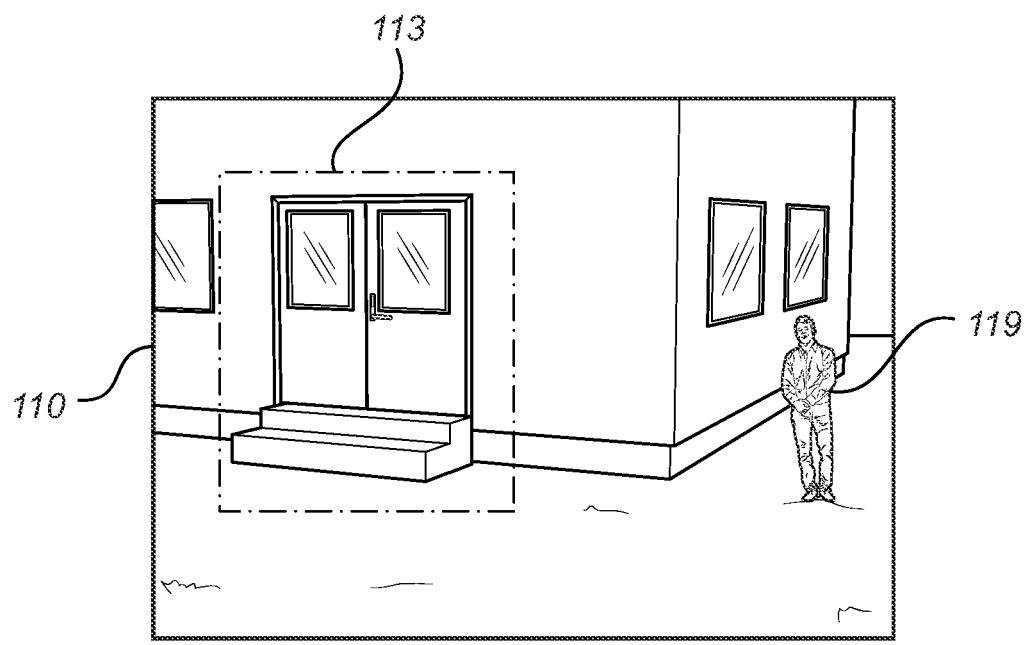
FIG. 4 illustrates a spatially restricted event-based trigger condition that causes encoding using a non-generative image model.

Together with the object types and event types, the operator may have the option of configuring a condition (trigger condition) that the object in question shall be visible in a predefined image area. This is illustrated in FIG. 4, where only objects visible inside the predefined area 113 around the entrance of the building can lead to a positive outcome of step 210. By contrast, the presence of an object (a person) 119 outside the predefined area 113 is insufficient to produce a positive outcome of step 210.

In some embodiments, where the image 110 is a frame in a video sequence 130, step 210 may apply prediction and/or interpolation to the object's presence and location, or both. Such prediction and interpolation reflect an assumption that consecutive frames are temporally correlated, e.g., since they have been captured by a camera directed at the same scene. In the same vein, a recognized object can be followed between consecutive frames on the basis of visual motion tracking and/or a camera orientation parameter and/or a camera field-of-view parameter. In particular, to maintain up-to-date image coordinates a recognized object which is stationary relative to the scene, it makes sense to detect and approximately invert any changes in pan-tilt-zoom (PTZ) settings of the camera.

In the case of a negative outcome of the first step 210, the execution flow continues to step 220. In the case of a positive outcome, that an object agreeing with the predefined object or event type(s) is visible, the conditional right-hand branch of the flowchart is next.

Figure 3:
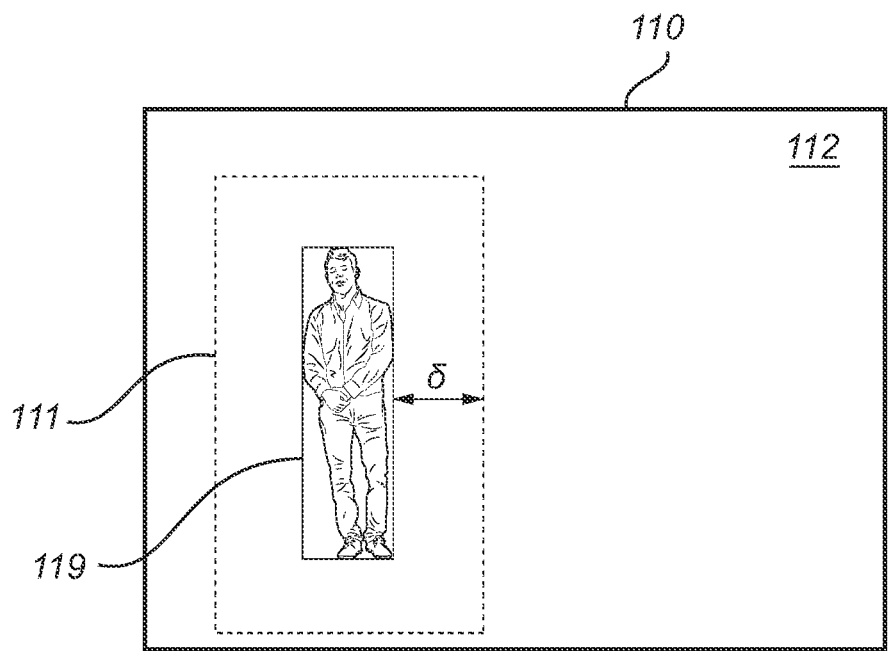
FIG. 3 illustrates the step of defining a ROI on the basis of a recognized and localized objected in an image.

The right-hand branch begins with an optional step 212 of defining the ROI 111. The ROI 111 (or multiple ROIs) may be defined on the basis of a location of an object 119 that was recognized in the first step 210. The ROI may further be defined on the basis of a detected extent of the recognized object 119, and optionally with a margin around. The addition of such a margin is illustrated in FIG. 3, where the ROI 111 extends 5 units outside a bounding box of the recognized object 119. The size of the margin 5 may be determined by considering a maximum motion vector size to be used by the encoder, or the accuracy of the location and/or bounding box of the recognized object 119. In further refinements of these teachings, the size of the margin 5 may be determined on the basis of the maximum motion vector size that has been used in the latest N frames, where N is a configurable integer. Alternatively or additionally, the size of the margin 5 may be determined on the basis of the size of the image blocks (macroblocks, I blocks, P blocks) used in an interframe prediction coding process.

As mentioned, step 212 is optional. For example, it can be omitted in such embodiments of the method 200 where a spatially restricted condition is evaluated in the first step 210. In this case, the ROI 111 is set equal to the predefined area 113 (see FIG. 4). In other embodiments, the extent of the ROI 111 may be defined in accordance with operator input. In still further embodiments, the extent of the ROI 111 may be predefined and constant in terms of image coordinates.

In a next step 214, the ROI 111 is encoded using the non-generative image model 160. The output of the encoding is first image data, from which the ROI 111 can be restored. As mentioned, the non-generative image model 160 can include encoding in accordance with transform coding, hybrid coding (combinations of predictive coding and transform coding), ITU H.26x, AV1 or JPEG, to mention a few examples. If the ROI 111 is encoded by transform coding, the first image data represents transform coefficients which describe the ROI 111. The ROI 111 can be restored by applying the transform coefficients to basis functions (e.g., cosines in the case of the Discrete Cosine Transform). In conformity with the above-mentioned characteristics of a non-generative image model, as developed in earlier sections of this disclosure, the use of the basis functions achieves a decoding of the first image data into the ROI 111 without any reliance on information derived from images other than the encoded image. In some embodiments, where the image 110 is a frame in a video sequence, 130, step 214 includes the application of an encoding method with inter-frame prediction. In that case, the decoding makes use of previously decoded frames in the video sequence 130 but does not rely on information derived from images outside the video sequence 130.

The conditional branch of the flowchart in FIG. 2, which is executed only when it has been established 210 that an object constituting any of the predefined object types or performing any of the predefined event types is visible in the image 110, contains two further optional steps.

The first optional step 216a targets any audio content that is associated with the image 110. Images 110 which are frames in a video sequence 130 oftentimes carry associated audio content, though still images could have audio content as well. In embodiments where the optional step 216a forms part of the conditional branch of the flowchart, the encoder 150 includes an audio encoder portion (not shown) which has at its disposal a non-generative audio model and a further audio model. The use of the non-generative audio model enables decoding of the audio content without relying on information derived from audio data other than said associated audio, and the further audio model may be a generative audio model, with favorable data compression performance but possibly a lower perceived evidentiary value. In such embodiments, the audio is encoded either using the non-generative audio model (step 216a) or using the further audio model (step 216b, in the mandatory branch of the flowchart). It is notable that the audio content, unlike the image 110, is processed uniformly within each frame, i.e., without being partitioned into parts analogous to the ROI 111 and the remainder 112 of the image 110.

In the second optional step 218, a snapshot of the weights of a neural network is stored, which neural network is going to be used for encoding the remainder 112 of the image 110, using the generative image model. This storing could strengthen the evidentiary value of the coded version of the remainder 112 (second image data), as the access to the snapshots of the neural network weights makes it possible to repeat the encoding operation for verification purposes, if needed.

After all steps in the conditional branch have been performed (one, two, three or four steps, in different embodiments), the execution flow continues to step 220 where it joins the mandatory branch of the method 200.

In step 220, the remainder 112 of the image 110 is encoded using the generative image model 170. The generative image model 170 may include one or more of the following: a machine-learning based encoder, an artificial neural network encoder, an autoencoder, a variable autoencoder, a generative adversarial network (GAN) encoder, a convolutional neural network (CNN) encoder, a recurrent neural network (RNN) encoder, an autoregressive model, a flow model. In some embodiments, where the image 110 is a frame in a video sequence 130, step 220 includes an encoding method with inter-frame prediction.

Figure 5:
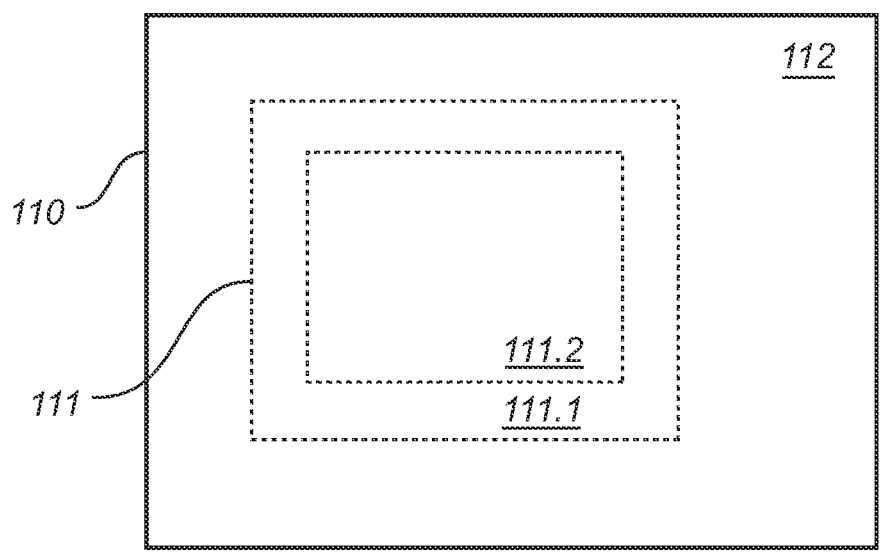
FIG. 5 illustrates a case where the image regions which are encoded using the generative and the non-generative image models overlap.

The presence of the optional step 222 indicates to the possibility that, in some embodiments, it is not only the remainder 112 that is encoded using the generative image model. Here, as seen in FIG. 5, also a portion 111.1 of the ROI 111 ("overlap") is encoded using the generative image model. This produces third image data, from which the overlap 111.1 can be restored using the generative image model. The overlap 111.1 may for example be a boundary zone (fringe, edge) of the ROI 111. The complement 111.2 of the overlap 111.1 in the ROI 111 is encoded only using the non-generative image model. It is noted that the steps 220 and 222 can be united, that is, the remainder 112 and the overlap 111.1 can be encoded in a common process. Similarly, it is not essential for the first and third image data to be separable, e.g., in the sense that the ROI 111 can be restored without restoring the overlap 111.1, or vice versa.

Still with reference to step 222, in one particular embodiment, the encoding of the entire image 110 using the generative image model continues in parallel to the conditional encoding of the ROI 111 using the non-generative image model (step 214). This particular embodiment is unlike the configuration shown in FIG. 5, where the complement 111.2 is nonempty.

The audio-related step 216b has already been described. It is executed only if step 216a, in the conditional branch, has not been executed.

The method 200 concludes, in some embodiments, with a final step of generating a digital signature 123 by which the authenticity of the first image data and/or the second image data can be verified. Optionally, the digital signature 123 is generated for a larger dataset, one that includes the neural-network weights stored in step 218 as well.

The decoding device 180 may be configured to perform a decoding method, having as input image data that includes first image data obtained by encoding using a non-generative image model and second image data obtained by encoding using a generative image model. The method comprises the steps: decoding the first image data using the non-generative image model without relying on information derived from images other than the encoded image or, if the image is a frame in a video sequence, without relying on information derived from images outside the video sequence, thereby obtaining a first region 111 of the image; decoding the second image data using the generative image model, thereby obtaining a second region 112 of the image; and combining the first and second regions of the image. The combining can be assisted by an indication of the location of the first region of the image (e.g., relative to the second region), which indication can be derived from the first or second image data.

The aspects of the present disclosure have mainly been described above with reference to a few embodiments. However, as is readily appreciated by a person skilled in the art, other embodiments than the ones disclosed above are equally possible within the scope of the claims, as defined by the appended patent claims.

The invention claimed is:

1. A method of encoding an image, the method comprising:
    establishing whether one or more objects constituting one or more predefined object types or performing one or more predefined event types are visible in the image;
    in response to establishing that said objects are visible, encoding at least one region-of-interest of the image using a non-generative image model, thereby obtaining first image data, wherein said one or more objects are visible in the region-of-interest, wherein encoding using the non-generative image model includes encoding in accordance with transform coding or a combination of predictive coding and transform coding; and
    encoding any remainder of the image only using an encoder neural network of a generative image model, thereby obtaining second image data, wherein the generative image model includes the encoder neural network and a decoder neural network, wherein at least one of the encoder neural network and the decoder neural network is generative, and wherein the encoder neural network and the decoder neural network have been trained in conjunction with each other in accordance with images other than the image to be encoded,
    wherein use of the non-generative image model enables decoding of the first image data without relying on information derived from images other than the encoded image or, if the image is a frame in a video sequence, enables decoding of the first image data without relying on information derived from images outside the video sequence.

2. The method of claim 1, wherein use of the non-generative image model enables decoding of the first image data:
    without inserting information derived from images other than the encoded image, or if the image is a frame in a video sequence, without inserting information derived from images outside the video sequence, or
    without processing the first image data by a function that depends on information derived from images other than the encoded image, or
    if the image is a frame in a video sequence, without processing the first image data by a function that depends on information derived from images outside the video sequence.

3. The method of claim 1, wherein use of the non-generative image model enables non-stochastic decoding of the first image data.

4. The method of claim 1, wherein the generative image model is adapted for decoding by an artificial neural network which has been trained using information derived from images other than the encoded image or, if the image is a frame in a video sequence, using information derived from images outside the video sequence.

5. The method of claim 1, wherein the generative image model is adapted for decoding by stochastic sampling from a probability distribution.

6. The method of claim 1, wherein the generative image model includes an artificial neural network with trainable weights, the method further comprising:
    in response to establishing that said objects are visible, storing a snapshot of the trainable weights.

7. The method of claim 6, further comprising:
    generating a digital signature for a dataset including the snapshot of the trainable weights, the first image data and the second image data.

8. The method of claim 1, wherein establishing whether said objects are visible includes one or more of:
    executing a visual object recognition process;
    executing a visual event recognition process;
    obtaining data from a detector configured to monitor a scene of the image or a neighborhood of the scene; and
    obtaining operator input.

9. The method of claim 8, wherein said establishing provides a location of a recognized object, the method further comprising:
    defining said at least one region-of-interest on the basis of a location of a recognized object.

10. The method of claim 9, wherein the defined at least one region-of-interest extends outside the recognized object by a nonzero margin.

11. The method of claim 8, wherein the object or event recognition process is configured to evaluate a condition that an object constituting one or more of the predefined object types or performing one or more of the predefined event type shall be visible in a predefined image area.

12. The method of claim 1, wherein:
    the image is a frame in a video sequence; and
    the encoding of one or more of said at least one region-of-interest and the remainder includes applying an inter-frame prediction method.

13. The method of claim 1, further comprising:
    in any frames where it is established that said objects are visible, encoding audio associated with the video sequence using a non-generative audio model; and
    in at least some frames where it is not established that said objects are visible, encoding said associated audio using an arbitrary audio model,
    wherein use of the non-generative audio model enables decoding of the audio without relying on information derived from audio data other than said associated audio.

14. A device comprising processing circuitry which is selectively operable in accordance with a non-generative image model and a generative image model,
    wherein use of the non-generative image model enables image data representing an encoded image to be decoded without relying on information derived from images other than the encoded image or, if the encoded image is a frame in a video sequence, enables the image data to be decoded without relying on information derived from images outside the video sequence, said device being configured to perform a method of encoding an image, the method comprising:

establishing whether one or more objects constituting one or more predefined object types or performing one or more predefined event types are visible in the image;

in response to establishing that said objects are visible, encoding at least one region-of-interest of the image using a non-generative image model, thereby obtaining first image data, wherein said one or more objects are visible in the region-of-interest interest, wherein encoding using the non-generative image model includes encoding in accordance with transform coding or a combination of predictive coding and transform coding; and encoding any remainder of the image only using an encoder neural network of a generative image model, thereby obtaining second image data, wherein the generative image model includes the encoder neural network and a decoder neural network, wherein at least one of the encoder neural network and the decoder neural network is generative, and wherein the encoder neural network and the decoder neural network have been trained in conjunction with each other in accordance with images other than the image to be encoded, wherein use of the non-generative image model enables decoding of the first image data without relying on information derived from images other than the encoded image or, if the image is a frame in a video sequence, enables decoding of the first image data without relying on information derived from images outside the video sequence.

15. A non-transitory computer-readable storage medium having stored thereon instructions for implementing a method, when executed on a device having processing capabilities, the method for encoding an image comprising:

establishing whether one or more objects constituting one or more predefined object types or performing one or more predefined event types are visible in the image;

in response to establishing that said objects are visible, encoding at least one region-of-interest of the image using a non-generative image model, thereby obtaining first image data, wherein said one or more objects are visible in the region-of-interest, wherein encoding using the non-generative image model includes encoding in accordance with transform coding or a combination of predictive coding and transform coding; and encoding any remainder of the image only using an encoder neural network of a generative image model, thereby obtaining second image data, wherein the generative image model includes the encoder neural network and a decoder neural network, wherein at least one of the encoder neural network and the decoder neural network is generative, and wherein the encoder neural network and the decoder neural network have been trained in conjunction with each other in accordance with images other than the image to be encoded, wherein use of the non-generative image model enables decoding of the first image data without relying on information derived from images other than the encoded image or, if the image is a frame in a video sequence, enables decoding of the first image data without relying on information derived from images outside the video sequence.

* * * * *